United States Patent
Moyer et al.

(10) Patent No.: US 7,277,972 B2
(45) Date of Patent: Oct. 2, 2007

(54) DATA PROCESSING SYSTEM WITH PERIPHERAL ACCESS PROTECTION AND METHOD THEREFOR

(75) Inventors: William C. Moyer, Dripping Springs, TX (US); Michael D. Fitzsimmons, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 937 days.

(21) Appl. No.: 10/094,082

(22) Filed: Mar. 8, 2002

(65) Prior Publication Data

US 2003/0172214 A1    Sep. 11, 2003

(51) Int. Cl.
    G06F 13/14        (2006.01)
    G06F 12/14        (2006.01)
(52) U.S. Cl. .................. 710/200; 710/110; 710/311
(58) Field of Classification Search ................. 709/210
    See application file for complete search history.

(56) References Cited

U.S. PATENT DOCUMENTS

| | | | |
|---|---|---|---|
| 5,367,695 A * | 11/1994 | Narad et al. ................. | 709/210 |
| 5,978,915 A * | 11/1999 | Lisart et al. .................. | 726/29 |
| 6,046,676 A | 4/2000 | Ward et al. | |
| 6,061,753 A * | 5/2000 | Ericson ...................... | 710/107 |
| 6,115,819 A | 9/2000 | Anderson | |
| 6,449,652 B1 * | 9/2002 | Blumenau et al. ........... | 709/229 |
| 6,473,825 B1 * | 10/2002 | Worley et al. ............... | 710/306 |
| 6,490,642 B1 * | 12/2002 | Thekkath et al. ........... | 710/110 |
| 6,662,251 B2 * | 12/2003 | Brock et al. ................ | 710/110 |
| 6,775,750 B2 * | 8/2004 | Krueger ....................... | 711/152 |
| 6,851,056 B2 * | 2/2005 | Evans et al. ................. | 713/193 |
| 2002/0138677 A1 | 9/2002 | Brock et al. | |
| 2003/0018860 A1 * | 1/2003 | Krueger ....................... | 711/152 |
| 2003/0200451 A1 * | 10/2003 | Evans et al. ................ | 713/193 |
| 2003/0221030 A1 * | 11/2003 | Pontius et al. .............. | 710/107 |

FOREIGN PATENT DOCUMENTS

EP        0 932 096 A2        7/1999

OTHER PUBLICATIONS

Tanenbaum, Andrew S.; "Structured Computer Organization"; Prentice-Hall, Inc.; 1990; Third Edition; pp. 11-13.*

* cited by examiner

Primary Examiner—Paul R. Myers
Assistant Examiner—Ryan M Stiglic
(74) Attorney, Agent, or Firm—Joanna G. Chiu; Susan C. Hill

(57) ABSTRACT

One embodiment of the present invention provides a flexible peripheral access protection mechanism within a data processing system (10) in order to obtain a more secure operating environment. For example, the data processing system may include a combination of secure (12) and unsecure bus masters (14, 15) needing to access shared peripherals (22, 24). One embodiment allows for the dynamic update by a secure bus master (12) of access permissions corresponding to each unsecure bus master for each peripheral. A secure bus master is therefore able to establish which unsecure bus masters have permission to access which peripheral in order to protect the data processing system from corruption due to errant or hostile software running on unsecure bus masters. Through the use of a bus master identifier (36), access to the requested peripheral is either allowed or denied based on the permissions established by the secure bus master.

20 Claims, 3 Drawing Sheets

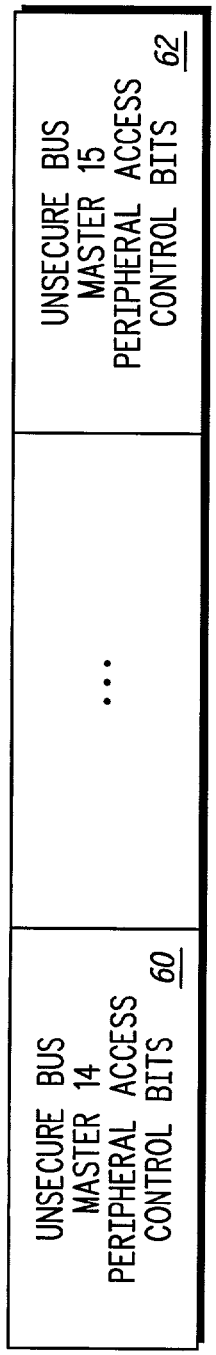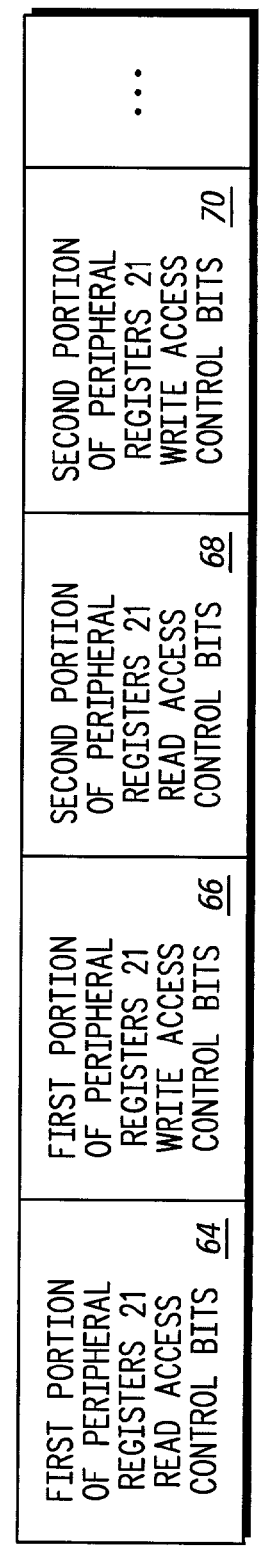

DATA PROCESSING SYSTEM WITH PERIPHERAL ACCESS PROTECTION AND METHOD THEREFOR

FIELD OF THE INVENTION

The present invention relates to a data processing system, and more particularly, to a data processing system with peripheral access protection.

RELATED ART

In system on a chip (SoC) solutions, it is common to have multiple masters with shared peripheral devices. Some of the masters of the SoC may be non-trusted masters. In such systems, it may be necessary to protect some or all peripherals from being accessed by the non-trusted masters because such access may result in corruption of the system. For example, viruses may be introduced by software running on the non-trusted masters or the non-trusted masters may be used to gain access to secure information within the peripheral devices of the system. Also, protection of the peripherals may be required in order to ensure secure data transactions.

One prior art solution requires that each master within a system have its own dedicated peripherals such that peripherals are not shared between masters. The use of dedicated peripherals, however, results in the need to replicate many peripherals that could otherwise be shared, thus resulting in increased chip area and cost. Also, the use of masters with dedicated peripherals prevents the use of processing load balancing within the system. For example, a process executed by one master cannot be transferred to another master within the system if it does not have the necessary dedicated peripherals to perform the transferred process, thereby reducing efficiency of the system.

Therefore, a need exists for a data processing system that allows both trusted and non-trusted masters to share peripheral devices within the data processing system while protecting access to these shared peripheral devices by the non-trusted masters.

BRIEF DESCRIPTION OF THE DRAWINGS

The present invention is illustrated by way of example and not limited by the accompanying figures, in which like references indicate similar elements, and in which:

FIG. 3 illustrates, in block diagram form, an access control register in accordance with one embodiment of the present invention; and FIG. 4 illustrates, in block diagram form, a portion of the access control register of FIG. 3 in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

One embodiment of the present invention provides a flexible peripheral access protection mechanism within a data processing system in order to obtain a more secure operating environment. For example, the data processing system may include a combination of secure and unsecure bus masters needing to access shared peripherals. One embodiment allows for the dynamic update by a secure bus master of access permissions corresponding to each unsecure bus master for each peripheral. A secure bus master is therefore able to establish which unsecure bus masters have permission to access which peripheral in order to protect the data processing system from corruption due to errant or hostile software running on unsecure bus masters. Through the use of a bus master identifier, access to the requested peripheral is either allowed or denied based on the permissions established by the secure bus master.

Figure 1:
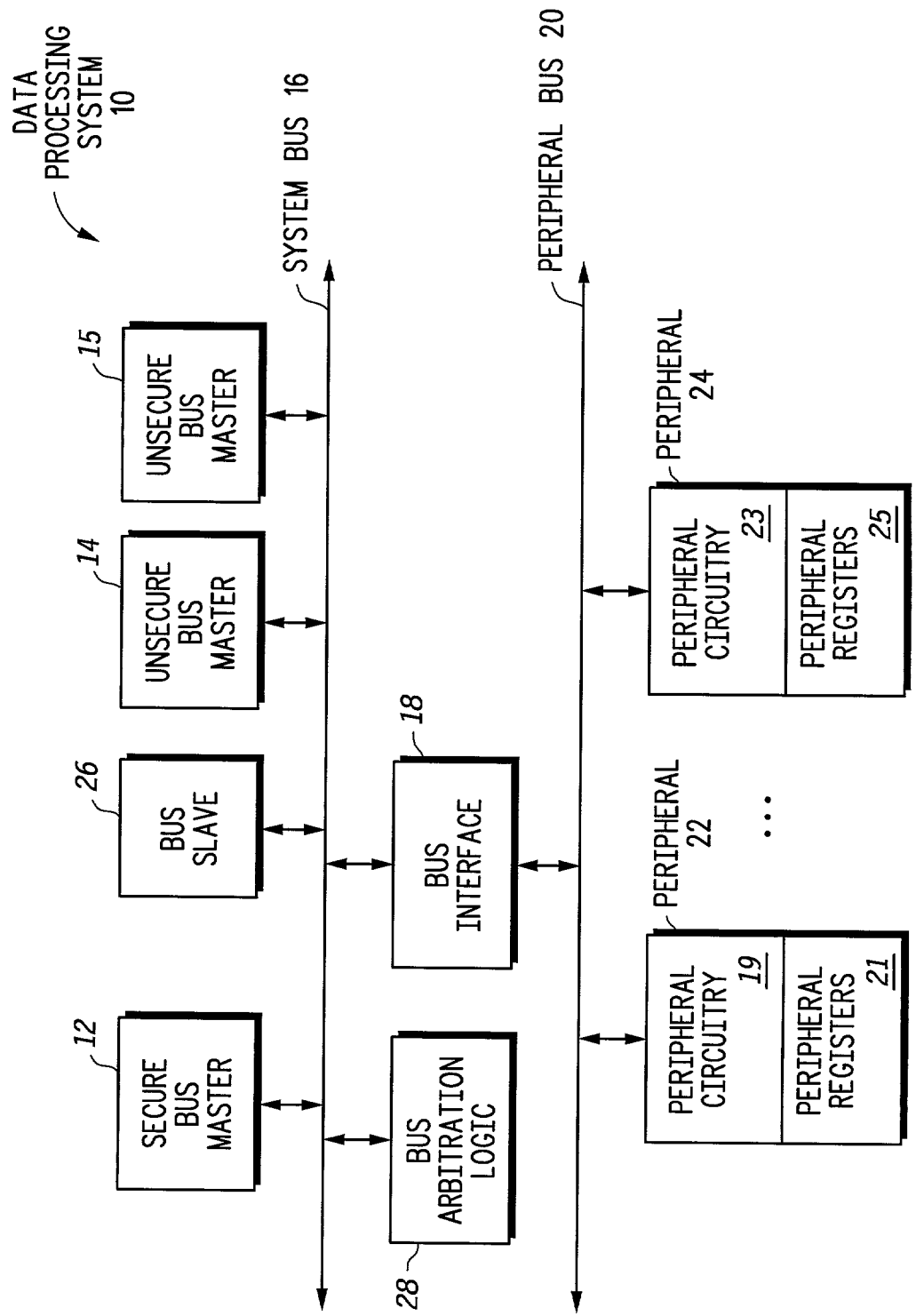
FIG. 1 illustrates, in block diagram form, a data processing system in accordance with one embodiment of the present invention.

FIG. 1 illustrates one embodiment of a data processing system 10. Data processing system 10 includes a secure bus master 12, a bus slave 26, an unsecure bus master 14, an unsecure bus master 15, bus arbitration logic 28, a system bus 16, a bus interface 18, a peripheral bus 20, and peripherals 22 and 24. Secure bus master 12, bus slave 26, unsecure bus master 14, unsecure bus master 15, bus arbitration logic 28, and bus interface 18 are all bidirectionally coupled to system bus 16. Bus interface 18, peripheral 22, and peripheral 24 are all bidirectionally coupled to peripheral bus 20. Peripheral 22 includes peripheral circuitry 19 and peripheral registers 21, and peripheral 24 includes peripheral circuitry 23 and peripheral registers 25. Although only two peripherals 22 and 24 are illustrated in FIG. 1, data processing system 10 may include any number of peripherals coupled to peripheral bus 20. Likewise, any number of secure masters, unsecure bus masters, and slave devices may be coupled to system bus 16 and are not limited to those shown in FIG. 1. Also, while FIG. 1 illustrates bus arbitration logic 28 as a separate unit coupled to system bus 16, portions of bus arbitration logic 28 may be located in each of the bus masters (or in a portion of the bus masters) coupled to system bus 16. (Bus arbitration logic 28 may operate as any known bus arbiter in the art today).

In one embodiment, secure bus master 12, unsecure bus master 14, and unsecure bus master 15 may be processors, such as microprocessors, digital signal processors, etc., or may be any other type of master device, such as a direct memory access (DMA) unit. In one embodiment, secure bus master 12 is a processor that is less susceptible to corruption than unsecure bus masters 14 and 15. For example, secure bus master 12 may execute instructions that are completely controlled by the manufacturer of secure bus master 12 (i.e. the software running on secure bus master 12 is considered trusted software.) That is, in this example, third party software is unable to execute on secure bus master 12 and no third parties are allowed access to secure bus master 12. Alternatively, the level of security for secure bus master 12 may vary from completely secure to less trusted and depends on the design of data processing system 10, but is generally more secure than unsecure bus masters 14 and 15.

Unsecure bus masters 14 and 15 are generally more accessible. In one embodiment, unsecure bus masters 14 and 15 may be general applications processors that may receive and execute third-party software (e.g. user developed software) or any other untrusted software (where the contents and the function of the software are generally unknown). Since the software is untrusted, it may be errant or hostile software which may attempt to corrupt secure bus master 12 or peripherals 22 and 24, introduce a virus into data processing system 10, or access secured information within secure bus master 12, peripherals 22 and 24, or data processing system 10.

Bus slave 26 may be any slave device, such as, for example, a memory accessible by secure bus master 12 and unsecure bus masters 14 and 15. Peripherals 22 and 24 may be any type of peripheral, such as a universal asynchronous receiver transmitter (UART), a real time clock (RTC), a keyboard controller, etc. Peripheral circuitry 19 permits communication between peripheral bus 20 and peripheral registers 21. Similarly, peripheral circuitry 23 permits communication between peripheral bus 20 and peripheral registers 25. In an alternate embodiment, peripheral 22 may be a memory unit where peripheral registers 21 would be memory address locations instead.

In operation, secure bus master 12, unsecure bus master 14, and unsecure bus master 15 request access of system bus 16 to request access to other slave devices coupled to system bus 16 or to request access to peripherals 22 and 24 via bus interface 18. Bus interface 18, as will be described below, determines whether a request to a particular peripheral or to a particular register (or set of registers) is allowed. If not allowed, bus interface 18 may provide a bus error response via system bus 16. However, if the request is allowed, bus interface 18 will provide any necessary bus protocol to complete the request. In one embodiment, secure bus master 12 has unlimited access to peripherals 22 and 24 since it is a generally trusted processor. However, unsecure bus masters 14 and 15 may each have only limited access rights to peripheral registers 21 and peripheral registers 25, as established by secure bus master 12. Unsecure bus masters may require access to a subset of a peripheral's resources for efficient operation of data processing system 10; however, by limiting access by certain bus masters to the peripherals, a higher degree of system integrity and security may be maintained.

Figure 2:
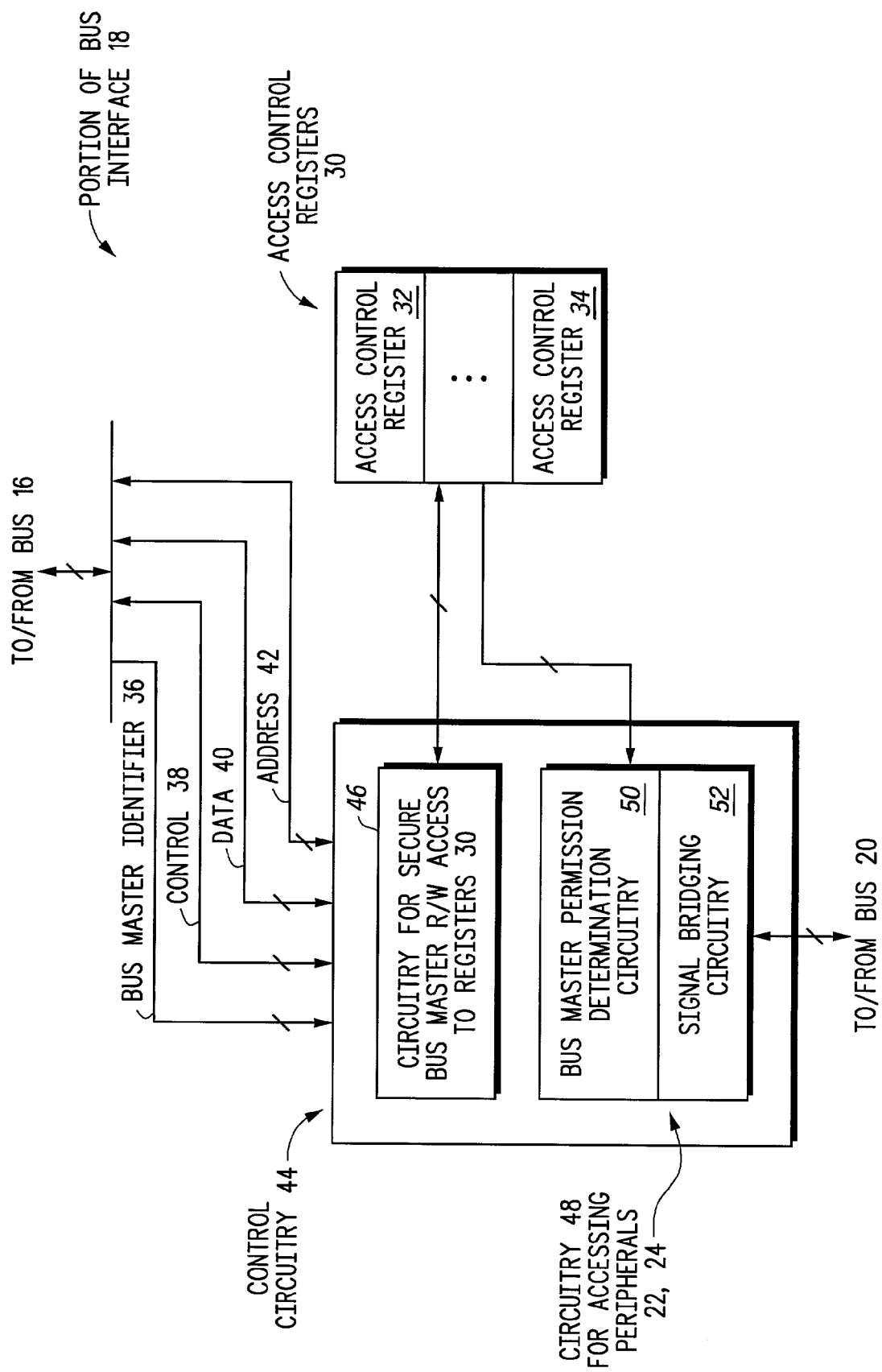
FIG. 2 illustrates, in block diagram form, a portion of a bus interface of FIG. 1, in accordance with one embodiment of the present invention.

FIG. 2 illustrates a portion of bus interface 18 of FIG. 1 in accordance with one embodiment of the present invention. Bus interface 18 includes control circuitry 44 and access control registers 30. Control circuitry 44 provides and receives address 42, data 40, and control 38 via system bus 16. Control circuitry 44 also receives a bus master identifier 36 via system bus 16. Control circuitry 44 includes circuitry 46 for secure bus master read/write (R/W) access to registers 30 that is bidirectionally coupled to access control registers 30. Control circuitry 44 also includes circuitry 48 for accessing peripherals 22, 24. Circuitry 48 includes bus master permissions determination circuitry 50 which receives information from access control registers 30. Control circuitry 48 also includes signal bridging circuitry 52 which is bidirectionally coupled to peripheral bus 20 in order to provide and receive appropriate signals to and from peripherals 22 and 24. Access control registers 30 include access control register 32 and access control register 34. In one embodiment, access control registers 30 may include only a single register, or alternatively, may include any number of registers, as will be described further below in reference to FIGS. 3 and 4.

In operation, bus interface 18 provides access to access control registers 30 based on bus master identifier 36. Bus master identifier 36 identifies to control circuitry 44 which bus master is providing the current request. For example, in one embodiment, each bus master in data processing system 10 may have a corresponding identification (ID) number. For example, secure bus master 12 may have a corresponding ID number of 0, unsecure bus master 14 may have a corresponding ID number of 1, and unsecure bus master 15 may have a corresponding ID number of 2. Any bus masters in data processing system 10 can therefore be assigned unique ID numbers. When a particular bus master requests access to a peripheral, its corresponding ID number can be provided to control circuitry 44 as bus master identifier 36. In this example, if bus master identifier 36 is 0, secure bus master 12 is indicated. In alternate embodiments, any type of identification system may be used to differentiate a secure bus master (or multiple secure bus masters) from unsecure bus masters and to differentiate among different bus masters.

Bus interface 18, via circuitry 46, ensures that only a secure bus master is able to obtain R/W access to access control registers 30. Circuitry 46 compares the incoming bus master identifier 36 to determine if secure bus master 12 is requesting R/W access to access control registers 30 or if an unsecure bus master (such as unsecure bus master 14 or 15) is requesting R/W access to access control registers 30. Therefore, in the example described in the previous paragraph, circuitry 46 compares bus master identifier 36 to 0 to determine if R/W access to access control registers 30 is allowed. If secure bus master 12 requests R/W access to registers 30, then secure bus master 12 is granted access and is able to freely read from or write to access control registers 30. In this manner, secure bus master 12 is able to set access permissions granted to each unsecure bus master by programming access control registers 30. Secure bus master 12 may program the values into access control registers 30 upon power up, upon reset, in response to initiation of a software application, or at any other appropriate time. This allows for dynamic access to access control registers 30 such that they may be updated as necessary. Alternatively, though, the values within access control registers 30 may be programmed a single time (such as by using a write once only memory), programmed only a limited amount of times, or may be hardwired. Prior to discussing circuitry 48 for accessing peripherals 22, 24, the contents of access control registers 30 will be described in reference to FIGS. 3 and 4.

FIG. 3 illustrates one embodiment of an access control register within access control registers 30. For example, FIG. 3 illustrates access control register 32 having unsecure bus master 14 peripheral access control bits 60 and unsecure bus master 15 peripheral access control bits 62. In this example, access control registers 30 may require only a single register such as access control register 32 of FIG. 3 in which peripheral access control bits (such as control bits 60 and 62) are provided for each unsecure bus master. Each set of peripheral access control bits may have one or more bits that provide access control information for the corresponding unsecure bus master. In one embodiment, each set of peripheral access control bits may have a single bit per peripheral which indicates whether read/write access to the corresponding peripheral by the corresponding unsecure bus master is allowed or not. Alternatively, each set of peripheral access control bits may include two bits per peripheral where one bit indicates whether read access to the corresponding peripheral by the corresponding unsecure bus master is allowed or not and the other bit indicates whether write access to the corresponding peripheral by the corresponding unsecure bus master is allowed or not.

In yet another embodiment, the peripheral registers within each peripheral can be subdivided into subsets (or portions), where each subset may include one or more of the peripheral registers such that access can be allowed or denied to a particular subset or portion of registers depending on the requesting bus master and the type of access. This embodiment can better be understood in reference to FIG. 4. For example, FIG. 4 illustrates one embodiment of unsecure bus master 14 peripheral control bits 60, where control bits 60 include both read and write access control bits for accessing different portions of peripheral registers 21. For example, first portion of peripheral registers 21 read access control bits 64 and first portion of peripheral registers 21 write access control bits 66 provide read and write access control information, respectively, granted by secure master 12 to unsecure bus master 14 to access a first portion of peripheral registers 21 within peripheral 22. Similarly, second portion of peripheral registers 21 read access control bits 68 and second portion of peripheral registers 21 write access control bits 70 provide read and write access control information, respectively, granted by secure master 12 to unsecure bus master 14 to access a second portion of peripheral registers 21 within peripheral 22. Therefore, access to only a portion of the peripheral registers may be granted. Also, the first portion and the second portion of peripheral registers 21 may be overlapping portions of registers 21 or may be completely different portions of registers 21. Furthermore, separate read and write access control bits for each portion of registers 21 may not be required such that read and write access are either both allowed or not for a particular portion of registers 21.

Unsecure bus master 14 peripheral access control bits 60 include any number of control bits, as required. For example, in addition to control bits 64, 66, 68, and 70, control bits for defining read and write access permissions to peripheral registers 25 (or portions thereof) may also be included as part of control bits 60. That is, control bits 60 include the control bits necessary to define read and write access permissions of unsecure bus master 14 to the peripherals on peripheral bus 20. These permissions, as discussed above, may be fully controlled by secure bus master 12 where only secure bus master 12 can change their values. Control bits 62 corresponding to unsecure bus master 15 would be similar to those defined in FIG. 4 for unsecure bus master 14. That is, control bits 62 may include the control bits necessary to define read and write access permissions of unsecure bus master 15 to the peripherals on peripheral bus 20. Also, access control register 32 of FIG. 3 may include peripheral access control bits for secure bus master 12; however, this is generally not necessary since secure bus master 12 generally has full access to all peripherals.

Alternate embodiments of access control registers 30 may include a register corresponding to each unsecure bus master which defines its access permissions to each peripheral. Alternatively, access control registers 30 may include a register corresponding to each peripheral which defines access permissions for each unsecure bus master. Furthermore, in this embodiment, each register may include a different set of bits for each portion of registers in the peripheral and the corresponding permissions for each portion of registers for each unsecure bus master. Therefore, read and write access permissions of each unsecure bus master for each peripheral can be defined and stored in a variety of ways within bus interface 18 or within data processing system 10 (and is also not limited to the use of registers).

Returning to FIG. 3, circuitry 48 for accessing peripherals 22, 24 includes bus master permission determination circuitry 50. Circuitry 50 receives address 42, control 38, and bus master identifier 36. Therefore circuitry 50 receives all the information necessary that identifies the type of access (read or write), the peripheral requested (and the particular register requested), and the identification of which bus master is making the request. Using information stored in access control registers 30, as was described above, circuitry 50 determines whether the currently requesting unsecure bus master has the necessary access permission for the particular peripheral register or registers requested. For example, a bus cycle may be initiated which requires access to a peripheral by a bus master (this bus cycle can be either a read or write bus cycle). During at least a portion of the bus cycle, bus master identifier 36 is provided. Bus master identifier 36 is used to select access control information (corresponding to the requesting bus master) from access control registers 30 for the bus cycle. It can then be determined if the access control information allows the requesting bus master to access the requested peripheral.

If access is allowed (meaning the requesting unsecure bus master does have the appropriate access permission for the particular peripheral register or registers being requested), then operation continues (i.e. the bus cycle continues) and the necessary bus protocol is provided to complete the operation. For example, signal bridging circuitry 52 provides any appropriate data, address, and control signals to the accessed peripheral derived from control 38, data 40, and address 42. Similarly, signal bridging circuitry 52 returns any necessary control, data, and address information to system bus 16 via control 38, data 40, and address 42.

However, if access is not allowed (meaning the requesting unsecure bus master does not have the appropriate access permission for the particular peripheral register or registers being requested), the bus cycle is terminated prior to accessing the peripheral. Also, a signal indicating that the requesting unsecure bus master is denied access to the peripheral may be provided via system bus 16. For example, a bus error may be provided via system bus 16 to the requesting unsecure bus master. The bus error can be provided by bus master permission determination circuitry 50 as one of control signals 38. In response, the unsecure bus master may perform appropriate exception handling to recover from the bus error. Alternatively, if access is not allowed, a reset of all or a portion of data processing system 10 may be performed.

As discussed above, secure bus master 12 may dynamically change permissions in access control registers 30 as necessary. In one embodiment, secure bus master 12 may change permissions in response to the initiation of a software application. For example, unsecure bus master 14 may alert secure bus master 12 that it is preparing to begin a software application. In response, secure bus master 12 may update access control registers 30 in order to provide unsecure bus master 14 access to the necessary peripheral registers in order to complete its application. Upon completing the application, secure bus master 12 may revoke the permissions previously granted such that permissions are only granted on an application by application basis.

In an alternate embodiment, peripheral 22 or 24 may be a memory unit where peripheral registers 21 or 25 may be memory locations. Access control registers 30, in this embodiment, would define access permissions for each unsecure bus master to specific memory locations or portions of the memory unit.

Also note that in alternate embodiments, the access control registers (i.e. the permission information) corresponding to each peripheral can be located within the peripheral rather than in bus interface 18. Furthermore, the bus master permission determination circuitry may also be located in the peripherals such that permission is determined by the peripheral prior to allowing access to the peripheral's registers. Therefore, alternate embodiments may store the permission information that is accessible by secure bus master 12 in any place within the memory map of data processing system 10. Also, data processing system 10 may include any number of secure bus masters that are capable of updating the permission information, and is not limited to a single secure bus master.

It can now be understood how data processing system 10 is capable of providing a flexible protection mechanism for a peripheral interface unit (e.g. bus interface 18) to ensure that the security requirements of the system can be achieved. Embodiments of the present invention allow for the dynamic update of permissions within the peripheral interface unit (such as within access control registers 30). Secure bus master 12 is therefore able to establish which unsecure bus masters have permission to access which peripheral registers in order to protect data processing system 10 from corruption due to errant or hostile software running on the unsecure bus masters. Through the use of the bus master identifier, access to the requested peripheral registers is either allowed or denied based on the permissions established by secure bus master 12.

Note that although FIGS. 1 and 2 illustrate the use of bidirectional conductors, it should be understood that a combination of unidirectional conductors may be used instead. Alternatively, a combination of bidirectional and unidirectional conductors may used. Signals may also be transferred serially via a single conductor or in parallel via a plurality of conductors. Alternatively, signals may be time multiplexed on a single or a plurality of conductors.

In the foregoing specification, the invention has been described with reference to specific embodiments. However, one of ordinary skill in the art appreciates that various modifications and changes can be made without departing from the scope of the present invention as set forth in the claims below. For example, it should be understood that data processing system 10 could be any type of data processing system which can be located on a single chip or integrated circuit (IC) or a combination of chips or ICs. Data processing system 10 can also apply to a variety of masters and slaves located on a network (coupled via a network system bus) having shared peripherals. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for providing peripheral access protection in a data processing system, comprising:
    initiating a bus cycle which requires access to a peripheral, wherein the bus cycle is a read bus cycle;
    providing a bus master identifier during at least a portion of the bus cycle;
    using the bus master identifier to select read access control information for the bus cycle, wherein the read access control information defines read access permission to the peripheral;
    determining if the access control information allows the bus master to access the peripheral;
    initiating a second bus cycle which requires access to the peripheral, wherein the second bus cycle is a write cycle;
    providing the bus master identifier during at least a portion of the second bus cycle;
    using the bus master identifier to select write access control information for the second bus cycle, wherein the write access control information defines write access permission to the peripheral and is separate from the read access control information; and
    determining if the write access control information allows the bus master to access the peripheral.

2. A method as in claim 1, further comprising:
    initiating a third bus cycle which requires access to the peripheral;
    providing a second bus master identifier during at least a portion of the second bus cycle;
    using the second bus master identifier to select second read or write access control information for the second bus cycle; and
    determining if the second read or write access control information allows the second bus master to access the peripheral.

3. A method as in claim 2, wherein the bus master identifier corresponds to the bus master and the second bus master identifier corresponds to the second bus master.

4. A method as in claim 1, wherein each of the read and write access control information for the bus cycle is modifiable.

5. A method as in claim 4, wherein each of the read and write access control information for the bus cycle is modifiable only once after reset.

6. A method as in claim 4, wherein each of the read and write access control information for the bus cycle is modifiable by said bus master, and said bus master is a secured bus master, and the bus master identifier corresponds to said secured bus master.

7. A method as in claim 1, further comprising:
    if the access control information allows the bus master to access the peripheral, continuing the bus cycle and accessing the peripheral; and
    if the access control information does not allow the bus master to access the peripheral, terminating the bus cycle before accessing the peripheral.

8. A method as in claim 7, wherein said step of terminating the bus cycle comprises:
    indicating that a bus error has occurred.

9. A method as in claim 1, further comprising:
    initiating a second bus cycle which requires access to another portion of the peripheral;
    providing the bus master identifier during at least a portion of the second bus cycle;
    using the bus master identifier and at least one address signal to select second access control information for the second bus cycle; and
    determining if the second access control information allows the second bus master to access said another portion of the peripheral.

10. A method as in claim 1, further comprising:
    initiating a third bus cycle which requires access to a storage circuit which stores the access control information;
    providing a second bus master identifier during at least a portion of the third bus cycle; and determining if the second bus master identifier allows an access to the storage circuit which stores the access control information.

11. A method as in claim 10, wherein the second bus master identifier allows the access to the storage circuit if the second bus master identifier corresponds to a secure bus master.

12. A method for providing peripheral access protection in data processing system, comprising:
  initiating a bus cycle which requires access to peripheral;
  providing a bus master identifier during at least a portion of the bus cycle;
  using the bus master identifier to select access control information for the bus cycle;
  determining if the access control information allows the bus master to access the peripheral, wherein the access control information for the bus cycle is modifiable, and wherein the access control information for the bus cycle is selectively modified in response to initiation of a software application executed by the data processing system, wherein the data processing system completes execution of the software application after the access control information for the bus cycle is selectively modified.

13. A method as in claim 12, further comprising:
  initiating a second bus cycle which requires access to a storage circuit which stores the access control information;
  providing the bus master identifier during at least a portion of the second bus cycle; and
  determining if the second bus master identifier allows an access to the storage circuit which stores the access control information.

14. A method as in claim 13, wherein the second bus master identifier allows the access to the storage circuit if the second bus master identifier corresponds to a secure bus master.

15. The method as in claim 12, wherein the access control information for the bus cycle is modifiable by said bus master, and said bus master is a secured bus master, and the bus master identifier corresponds to said secured bus master.

16. A method as in claim 12 further comprising:
  if the access control information allows the bus master to access the peripheral, continuing the bus cycle and accessing the peripheral; and
  if the access control information does not allow the bus master to access the peripheral terminating the bus cycle before accessing the peripheral.

17. A method as in claim 12, further comprising:
  initiating a second bus cycle which requires access to another portion of the peripheral;
  providing the bus master identifier during at least a portion of the second bus cycle;
  using the bus master identifier and at least one address signal to select second access control information for the second bus cycle; and
  determining if the second access control information allows the second bus master to access said another portion of the peripheral.

18. A method as in claim 12, further comprising:
  initiating a second bus cycle which requires access to the peripheral;
  providing a second bus master identifier during at least a portion of the second bus cycle;
  using the second bus master identifier to select second access control information for the second bus cycle; and
  determining if the second access control information allows the second bus master to access the peripheral.

19. A method as in claim 18, wherein the bus master identifier corresponds to the bus master and the second bus master identifier corresponds to the second bus master.

20. A method as in claim 12, wherein the access control information for the bus cycle is selectively modified in response to completion of a software application.

* * * * *

UNITED STATES PATENT AND TRADEMARK OFFICE
CERTIFICATE OF CORRECTION

PATENT NO.         : 7,277,972 B2                                         Page 1 of 1
APPLICATION NO.  : 10/094082
DATED              : March 8, 2002
INVENTOR(S)        : William C. Moyer It is certified that error appears in the above-identified patent and that said Letters Patent is hereby corrected as shown below:

In Column 10, Line 8, Claim No. 16:

Change "peripheral terminating" to --peripheral, terminating--

Signed and Sealed this

Twenty-seventh Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,277,972 B2 | Page 1 of 1 |
| APPLICATION NO. | : 10/094082 | |
| DATED | : October 2, 2007 | |
| INVENTOR(S) | : William C. Moyer | |

It is certified that error appears in the above-identified patent and that said Letters Patent is hereby corrected as shown below:

In Column 10, Line 8, Claim No. 16:

Change "peripheral terminating" to --peripheral, terminating--

This certificate supersedes the Certificate of Correction issued May 27, 2008.

Signed and Sealed this

Twenty-fourth Day of June, 2008

JON W. DUDAS
*Director of the United States Patent and Trademark Office*